United States Patent Office.

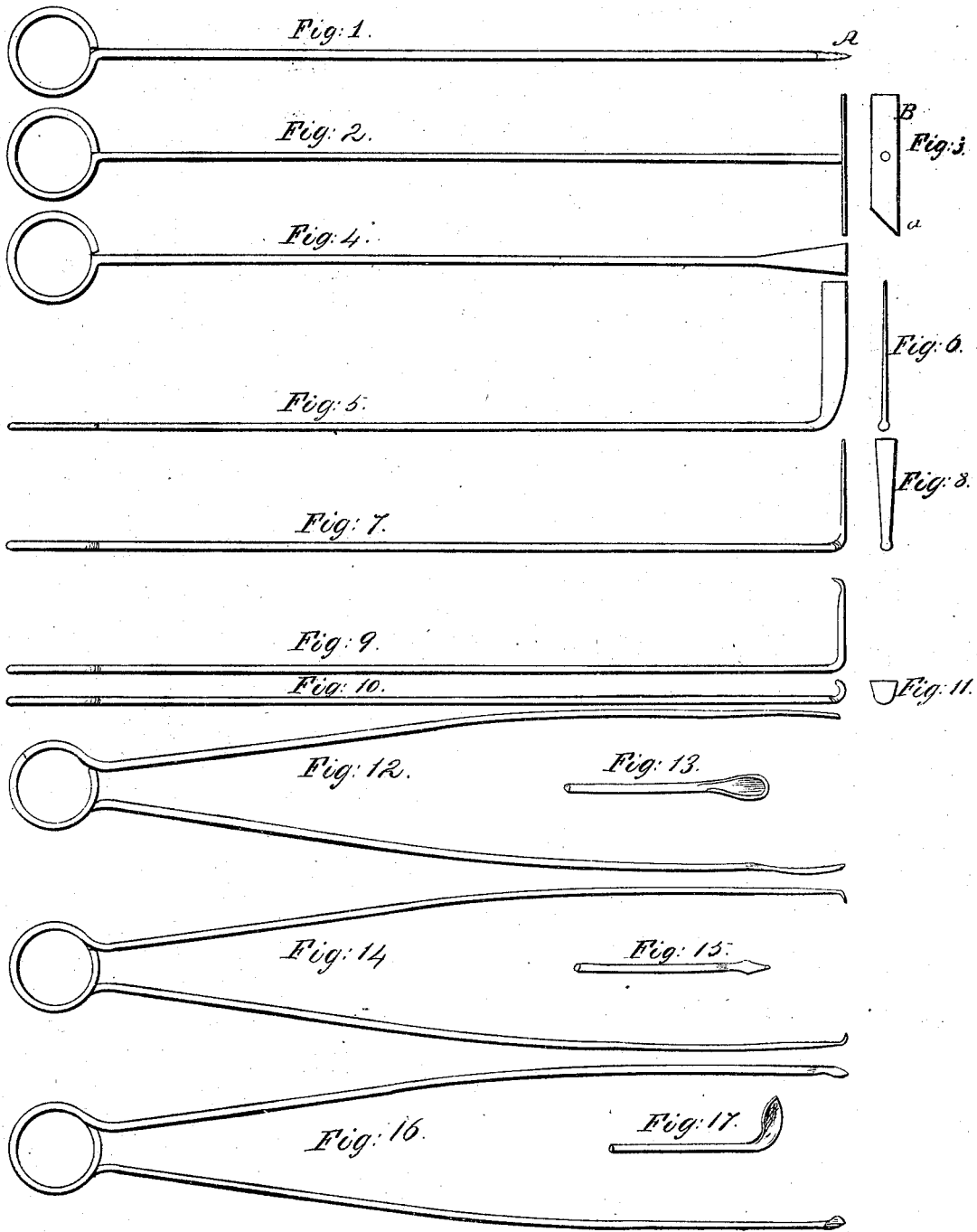

R. P. BUTTLES, OF MANSFIELD, PENNSYLVANIA

Letters Patent No. 97,161, dated November 23, 1869.

---

IMPROVEMENT IN BEE-MOTH INSTRUMENTS.

---

The Schedule referred to in these Letters Patent and making part of the same.

---

To all whom it may concern:

Be it known that I, R. P. BUTTLES, of Mansfield, in the county of Tioga, and State of Pennsylvania, have invented certain new and useful Improvements in Bee-Moth Instruments; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to devices for removing moth-worms, and everything pertaining to them, from bee-hives, and consists in the novel construction of a set of instruments especially adapted and suitable for the purposes.

In the drawings—

Figures 1, 2, 4, 5, 7, 9, 10, 12, 14, and 16, are side views;

Figure 3 is an end view of fig. 2;
Figure 6 is an end view of fig. 5;
Figure 8 is an end view of fig. 7;
Figure 11 is an end view of fig. 10; and
Figures 13, 15, and 17, are views of parts detached of figs. 12, 14, and 16, respectively.

The object of my invention is to furnish the bee-keeper with a set of instruments especially adapted to work in the crevices where the moth deposits its eggs, to cut away its galleries or coverings, and to destroy and exterminate this pestiferous vermin.

These instruments I make of any suitable metal, in the form clearly shown in the figures.

The point A, of instrument shown in fig. 1, is sharp and barbed, for the purpose of penetrating the body of the moth, and drawing it from its burrows or other places of concealment.

On the end of the instrument shown in fig. 2, and forming a part of it, I place a flat metallic head, B, shaped as shown in the figure, for the purpose of scraping along flat surfaces, and with one corner, a, suitable for working in corners or angles.

The ends of the instruments shown in figs. 4, 5, and 7, are adapted for chiselling, cutting, and working about the combs, so as to remove the covering of the moth, without unnecessary injury to the work of the bees, while the ends of those shown in figs. 9 and 10 are shaped into novel forms of hooks, both for cutting away the work of the moth and seizing and removing them.

Besides these, I make a series of tongs or pincers, in the form shown in figs. 12, 14, and 16, and with their ends, shaped as shown in figs. 13, 15, and 17. These may be used for removing the eggs, worms, and debris from the hives, and from the edges, crevices, cracks, and holes about them.

With the aid of my instruments, a careful and watchful bee-keeper may not only rid his hives of these vermin, but keep them entirely free from their mischievous work, and thus save his bees from being entirely destroyed, or compelled to abandon the hives in despair.

Having thus described my invention,

What I claim, is—

As new articles of manufacture, a set of instruments, substantially as herein described, for use in the rearing and management of bees.

R. P. BUTTLES.

Witnesses:
P. V. CLARK,
M. L. CLARK.